US012756347B2

(12) United States Patent
Nagura et al.

(10) Patent No.: US 12,756,347 B2
(45) Date of Patent: Oct. 6, 2026

(54) LOAD DRIVING DEVICE

(71) Applicant: DENSO CORPORATION, Kariya-city (JP)

(72) Inventors: Koki Nagura, Kariya-city (JP); Hideki Kabune, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 242 days.

(21) Appl. No.: 18/630,865

(22) Filed: Apr. 9, 2024

(65) Prior Publication Data

US 2024/0258947 A1 Aug. 1, 2024

Related U.S. Application Data

(63) Continuation of application No. PCT/JP2022/037603, filed on Oct. 7, 2022.

(30) Foreign Application Priority Data

Oct. 11, 2021 (JP) ................................ 2021-166732

(51) Int. Cl.
*H02P 27/06* (2006.01)
*B62D 5/04* (2006.01)
*H02J 7/00* (2006.01)

(52) U.S. Cl.
CPC ................ *H02P 27/06* (2013.01); *B62D 5/04* (2013.01); *H02J 7/855* (2026.01); *H02J 2207/20* (2020.01); *H02P 2201/07* (2013.01)

(58) Field of Classification Search
CPC ....... H02P 27/06; H02P 2201/07; B62D 5/04; H02J 7/0063; H02J 2207/20
See application file for complete search history.

(56) References Cited

U.S. PATENT DOCUMENTS

| | | | | |
|---|---|---|---|---|
| 2012/0139460 A1* | 6/2012 | Senkou | .................. | H02P 21/20 318/400.04 |
| 2016/0297471 A1* | 10/2016 | Yamanaka | ........... | B62D 5/0463 |
| 2020/0047805 A1 | 2/2020 | Oka et al. | | |
| 2020/0156699 A1* | 5/2020 | Tang | .................... | B62D 5/0463 |
| 2020/0209902 A1* | 7/2020 | Elias-Palacios | ........ | H02M 1/44 |

FOREIGN PATENT DOCUMENTS

| | | |
|---|---|---|
| JP | 2008018761 A | 1/2008 |
| JP | 2015104220 A | 6/2015 |

* cited by examiner

*Primary Examiner* — Zoheb S Imtiaz
(74) *Attorney, Agent, or Firm* — Precision Patents, P.C.

(57) ABSTRACT

A power converter of a load drive device is provided between a power supply line and a ground line connected to the battery, and converts a direct-current power of the battery and supplies it to a load. A booster circuit boosts a voltage of the battery supplied via the power supply line. A post-boost capacitor is charged with a boosted voltage by the booster circuit. A specific regulator operates a target circuit when a voltage equal to or higher than a lower limit value is applied via a power supply path. At least the voltage charged in the post-boost capacitor is applied to the specific regulator.

10 Claims, 6 Drawing Sheets

FIRST EMBODIMENT

FIRST EMBODIMENT

SECOND EMBODIMENT

COMPARATIVE EXAMPLE

LOAD DRIVING DEVICE

CROSS REFERENCE TO RELATED APPLICATIONS

This application is a continuation application of International Patent Application No. PCT/JP2022/037603 filed on Oct. 7, 2022, which designated the U.S. and based on and claims the benefits of priority of Japanese Patent Application No. 2021-166732 filed on Oct. 11, 2021. The entire disclosure of all of the above applications is incorporated herein by reference.

TECHNICAL FIELD

The present disclosure relates to a load driving device.

BACKGROUND

Conventionally, a load driving device is known that converts a direct-current (DC) power from a battery using a power converter such as an inverter and supplies the converted DC power to a load such as a three-phase motor.

SUMMARY

An object of the present disclosure is to provide a load driving device that allows a target circuit to continue operating even if the voltage supplied from a battery to a power supply line temporarily decreases.

A load driving device according to a first aspect of the present disclosure includes a power converter, a booster circuit, a post-boost capacitor, and a specific regulator. The power converter is provided between a power supply line connected to a battery and a ground line, and converts a direct-current (DC) power from the battery and supplies it to a load.

The booster circuit boosts a battery voltage supplied via the power supply line. The post-boost capacitor is charged with the boosted voltage from the booster circuit.

The specific regulator operates a target circuit when a voltage equal to or higher than a lower limit value is applied via the power supply path.

At least the voltage charged in the post-boost capacitor is applied to the specific regulator.

A load driving device according to a second aspect of the present disclosure does not need to include a booster circuit and a post-boost capacitor compared to the load driving device according to the first aspect, but is instead required to include a power converter capacitor. The power converter capacitor is connected in parallel with the power converter between the power supply line and the ground line, and is charged with the voltage applied to the power converter.

A voltage charged to at least the power converter capacitor is applied to the particular regulator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
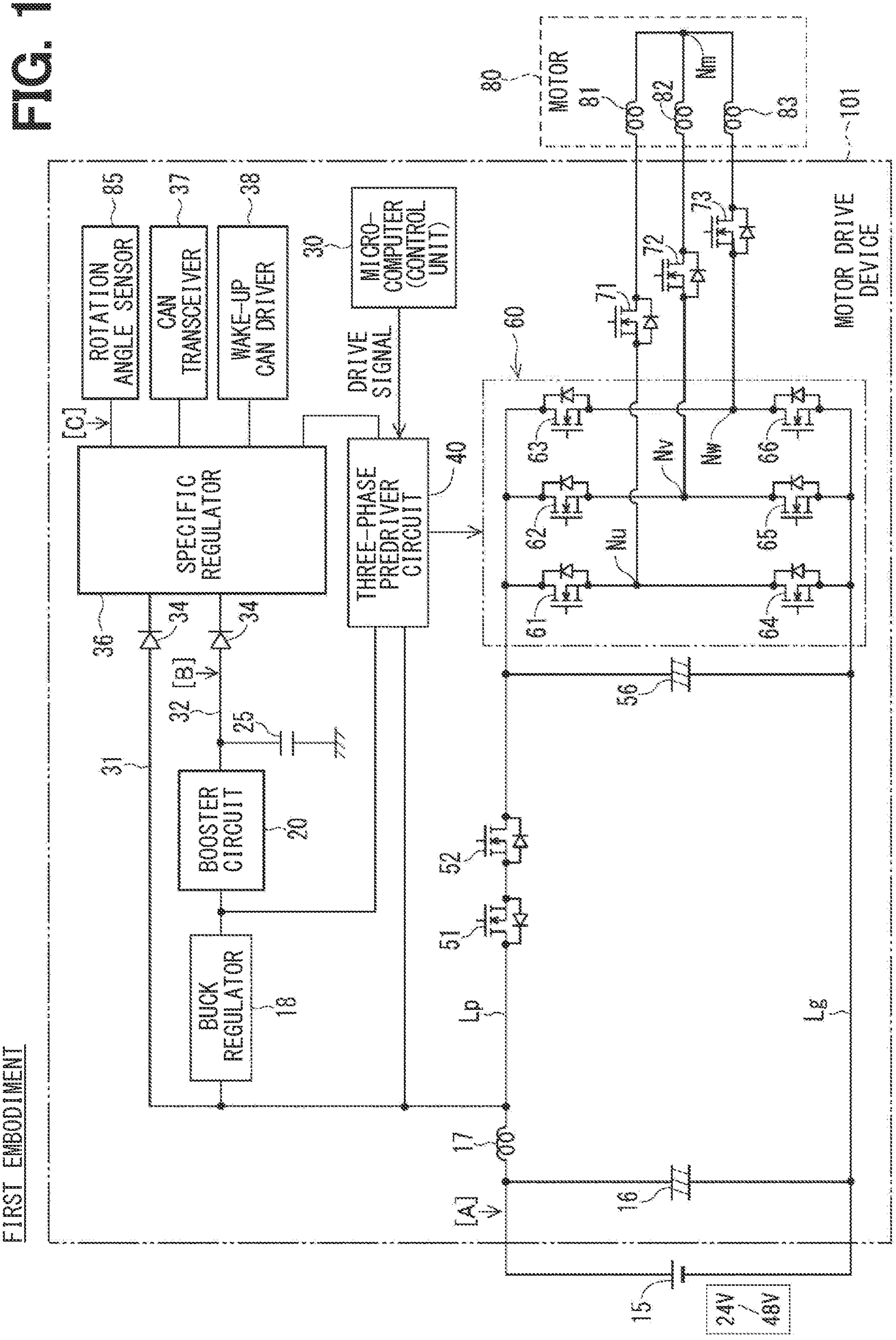
FIG. 1 is a configuration diagram of a motor drive device according to a first embodiment.

In an assumable example, a load driving device is known that converts a direct-current (DC) power from a battery using a power converter such as an inverter and supplies the converted DC power to a load such as a three-phase motor. For example, a steering angle detection device is provided with a rotation angle sensor that detects a rotation angle of the motor. Electric power is supplied to the rotation angle sensor from the battery via a regulator. The rotation angle sensor can continue operating with power supplied from the battery via the regulator.

In the above device, when there is an abnormality in which a power supply from the battery to a power line is interrupted, such as when a harness is about to break, or when a battery voltage decreases due to engine cranking and the power supply to a rotation angle sensor is interrupted, the rotation angle sensor will no longer be able to continue operating. In particular, in the steering assist motor of an electric power steering device, when the rotation angle sensor temporarily stops operating, information on a neutral position of a steering angle will not be maintained after returning, making it impossible to accurately calculate the steering angle during an assist control.

Furthermore, depending on the configuration of the device, in addition to the rotation angle sensor, when the voltage supplied from the battery to devices such as three-phase pre-driver, CAN transceiver, and wake-up CAN driver, it is not possible to continue the operation.

An object of the present disclosure is to provide a load driving device that allows a target circuit to continue operating even if the voltage supplied from a battery to a power supply line temporarily decreases.

A load driving device according to a first aspect of the present disclosure includes a power converter, a booster circuit, a post-boost capacitor, and a specific regulator. The power converter is provided between a power supply line connected to a battery and a ground line, and converts a direct-current (DC) power from the battery and supplies it to a load.

The booster circuit boosts a battery voltage supplied via the power supply line. The post-boost capacitor is charged with the boosted voltage from the booster circuit.

The specific regulator operates a target circuit when a voltage equal to or higher than a lower limit value is applied via the power supply path. For example, the load is a motor, and the target circuit includes a rotation angle sensor that detects a rotation angle of the motor.

At least the voltage charged in the post-boost capacitor is applied to the specific regulator. Even if the voltage supplied from the battery to the power line temporarily drops, the target circuit can continue operating.

A load driving device according to a second aspect of the present disclosure does not need to include a booster circuit and a post-boost capacitor compared to the load driving device according to the first aspect, but is instead required to include a power converter capacitor. The power converter capacitor is connected in parallel with the power converter between the power supply line and the ground line, and is charged with the voltage applied to the power converter.

A voltage charged to at least the power converter capacitor is applied to the particular regulator. Even if the voltage supplied from the battery to the power line temporarily drops, the target circuit can continue operating.

A load driving device according to a plurality of embodiments will be described based on the drawings. In the multiple embodiments, substantially the same components are denoted by the same reference numerals, and a description of the same components will be omitted. In the following description, first and second embodiments are collectively referred to as a present embodiment. The load driving device of the present embodiment is a motor drive device. This motor drive device converts the direct-current (DC) power from a battery in an electric power steering device and supplies it to a steering assist motor as a "load." The steering assist motor is configured by a three-phase brushless motor.

Although the voltage of an auxiliary battery mounted on a vehicle has conventionally been generally 12V, in the present embodiment, it is mainly assumed that the voltage is 24V or 48V, which is expected to be adopted in electric vehicles in the future. "24V/48V" in the figures and the following specification means "24V or 48V." However, even when a 12V battery is used, the configuration of the present embodiment is basically the same. As is clear from the reference to engine cranking in the explanation below, the present embodiment may be applied not only to an electric vehicle but also to a vehicle with a combustion engine.

Specifically, the ECU of the electric power steering device functions as a motor drive device. The ECU is configured by a microcomputer, a customized integrated IC, etc., and includes a CPU, a ROM, a RAM, an I/O, and a bus line (not shown) connecting these components. The ECU performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

First Embodiment

FIG. 1 shows the configuration of a motor drive device 101 according to a first embodiment. The motor drive device 101 includes an inverter 60 as a "power converter", an inverter capacitor 56 as a "power converter capacitor", a booster circuit 20, a post-boost capacitor 25, a specific regulator 36, and the like. Although FIG. 1 illustrates the configuration of one system of motor drive device 101, a redundant configuration of two or more systems of motor drive device 101 may be used. For example, in the two systems of motor drive device, power is supplied from two inverters to a double-winding motor having two sets of windings.

The inverter 60 is connected to a positive electrode of the battery 15 through a power supply line Lp, and is connected to a negative electrode of the battery 15 through a ground line Lg. The inverter 60 includes three sets of upper and lower arm switching elements 61 to 66, which are connected in series between the power supply line Lp and the ground line Lg. The upper arm switching elements 61, 62, and 63 of the U phase, V phase, and W phase and the lower arm switching elements 64, 65, and 66 of the U phase, V phase, and W phase are connected in a bridge configuration. In the present embodiment, MOSFETs are used as the switching elements 61 to 66 of the inverters 60. Hereinafter, the MOSFET used in the present embodiment is basically an N-channel type.

Connection points between the upper-arm switching elements and the lower-arm switching elements of phases are defined as inter-arm connection points Nu, Nv, Nw, respectively. The inter-arm connection points Nu, Nv, and Nw are connected to three-phase windings 81, 82, and 83 of the motor 80, respectively. The inverter 60 converts a DC power of the battery 15 and then supplies the converted power to the three-phase windings 81, 82, 83 of the motor 80. For example, when the motor 80 is in a Y-connection, the three-phase windings 81, 82, 83 are connected at a neutral point Nm. However, the three-phase windings 81, 82, and 83 may also be in delta connection.

The inverter capacitor 56 is connected in parallel with the inverter 60 between the power supply line Lp and the ground line Lg, and is charged with the voltage applied to the inverter 60. During normal operation of the motor drive device 101, the inverter capacitor 56 functions as a smoothing capacitor.

A filter capacitor 16 and a choke coil (inductor) 17 are provided on the battery 15 side of the inverter 60, which constitute a LC filter circuit for noise countermeasure. The filter capacitor 16 and the inverter capacitor 56 are configured by, for example, polar aluminum electrolytic capacitors. The choke coil 17 is provided on the power supply line Lp.

In the configuration of FIG. 1, a power supply relay 51 and a reverse connection protection relay 52 are connected in series in the power supply line Lp between the choke coil 17 and the inverter 60, and the power supply relay 51 is connected to the battery 15 side, and the reverse connection protection relay 52 is connected to the inverter 60 side. The power supply relay 51 has a freewheeling diode connected in parallel that conducts current from the inverter 60 side to the battery 15 side, and cuts off the current from the battery 15 side to the inverter 60 side when the power supply relay 51 is turned off.

The reverse connection protection relay 52 has free wheel diodes connected in parallel that conduct current from the battery 15 side to the inverter 60 side, and blocks current from the inverter 60 side to the battery 15 side when the reverse connection protection relay 52 is turned off. For example, the power supply relay 51 and the reverse connection protection relay 52 are configured by MOSFETS, and the parasitic diodes of the MOSFETs function as freewheeling diodes.

In other configuration examples, the power supply relay 51 may not be provided. Further, the reverse connection protection relay 52 may be provided on the ground line Lg.

The motor relays 71, 72, and 73 are provided in motor current paths between the inter-arm connection points Nu, Nv, Nw of each phase and three-phase windings 81, 82, and 83. For example, motor relays 71, 72, and 73 are configured by MOSFETs. The parasitic diodes conduct current from the inter-arm connection points Nu, Nv, Nw to the three-phase windings 81, 82, and 83. The motor relays 71, 72, and 73 cut off current from the motor 80 side to the inverter 60 side when the motor relays are turned off.

Although not shown, a current sensor for detecting phase current is provided in the inverter 60 or each phase motor current path. During normal operation of the motor drive device 101, the microcomputer (control unit) 30 calculates a drive signal for the inverter 60 by current feedback control based on a phase current detection value and a motor rotation angle so that the motor 80 outputs the command torque. The three-phase predriver circuit 40 operates the inverter 60 according to the drive signal calculated by the microcomputer 30. An integrated IC may share a part of the function of the control unit performed by the microcomputer 30. In the case of a two-system configuration, control information may be mutually communicated between the microcomputers of each system.

Also, when the system starts, stops, or when an abnormality occurs, a relay driver circuit (not shown) turns on/off the power supply relay 51, the reverse connection protection relay 52, and the motor relays 71, 72, and 73 based on commands from the microcomputer 30. Illustrations of gate signals and the like of each relay are omitted.

The booster circuit 20 is connected to the power supply line Lp after the choke coil 17, and boosts the battery voltage supplied via the power supply line Lp. The booster circuit 20 is configured with a chopper circuit including, for example, a coil and a switching element. When the battery voltage is 24V/48V, the voltage may be lowered to about 12V by the buck regulator 18 and then input to the booster circuit 20. The post-boost capacitor 25 is charged with the boosted voltage from the booster circuit 20.

24V/48V is input to the three-phase predriver circuit 40 as a power source for generating gate voltage of the switching elements 61 to 63 on the upper arm side (high side), and 12V from the buck regulator 18 is input as a power source for generating gate voltage of the switching elements 64 to 66 on the lower arm side (low side). When the battery voltage is 12V, the buck regulator 18 is not required.

The specific regulator 36 is a low dark current power supply that operates the target circuit when a voltage equal to or higher than the lower limit value is applied via the power supply path. A particularly important target circuit in the present embodiment is a rotation angle sensor 85 such as a Hall element that detects the rotation angle of the motor 80. The reason will be explained later. As target circuits other than the rotation angle sensor 85, ICs such as the three-phase predriver circuit 40, the CAN transceiver 37, and the wake-up CAN driver 38 are applicable.

The CAN transceiver 37 relays a communication between the CAN communication bus of the in-vehicle network and the microcomputer 30. The wake-up CAN driver 38 generates a wake-up signal via the CAN bus. Illustrations of input and output signals in the rotation angle sensor 85 and other target circuits 37, 38, and 40 are omitted.

In the first embodiment, two power supply paths 31 and 32 are provided for supplying power to the specific regulator 36. Each of the power supply paths 31 and 32 is provided with a diode 34 that prevents current from flowing backward. The first power supply path 31 is directly connected to the specific regulator 36 from the power supply line Lp after the choke coil 17. The battery voltage is applied to the specific regulator 36 via the first power supply path 31.

The second power supply path 32 branches from the first power supply path 31 and is connected to the specific regulator 36 via the buck regulator 18 and the booster circuit 20. The boosted voltage charged in the post-boost capacitor 25 is applied to the specific regulator 36 via the second power supply path 32.

Figure 2:
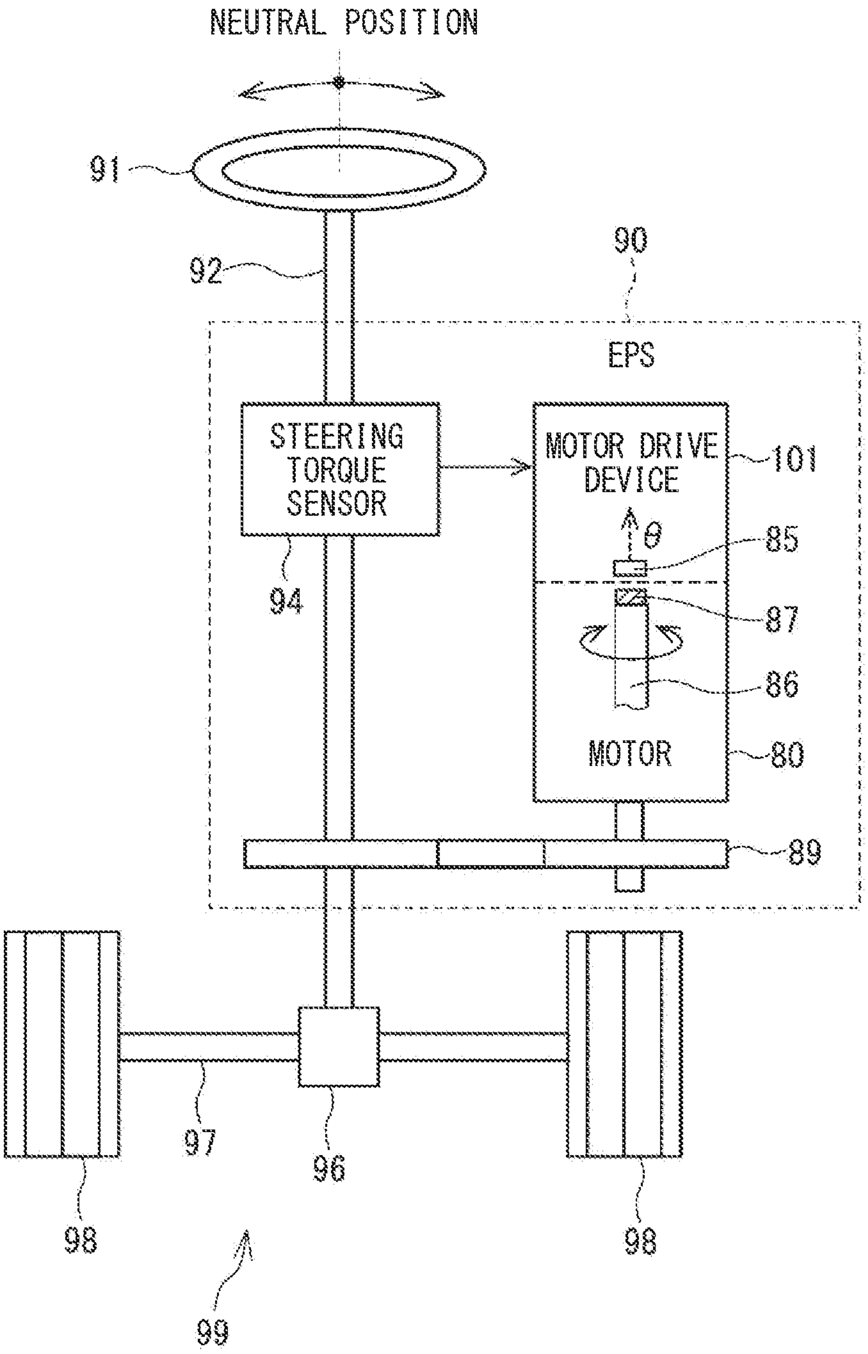
FIG. 2 is a schematic configuration diagram of an electric power steering device.

Next, referring to FIG. 2, a schematic configuration of an electric power steering device 90 ("EPS" in the figure) to which the motor drive device 101 is applied in a steering system 99 of a vehicle will be described. Although the electric power steering device 90 shown in FIG. 2 is a column assist type electric power steering device, it is similarly applicable to a rack assist type electric power steering device.

The steering system 99 includes a steering wheel 91, a steering shaft 92, a pinion gear 96, a rack shaft 97, road wheels 98, the electric power steering device 90 and the like. The steering shaft 92 is coupled to the steering wheel 91. The pinion gear 96 provided at an end of the steering shaft 92 engages with the rack shaft 97. A pair of road wheels 98 are provided at both ends of the rack shaft 97 via, for example, tie rods. When the driver rotates the steering wheel 91, the steering shaft 92 connected to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97.

The electric power steering device 90 includes a steering assist motor 80, the motor drive device 101, a steering torque sensor 94, a reduction gear 89, and the like. For example, the motor drive device 101 is integrally provided at one end of the motor 80 in the axial direction, and is configured as a "mechanical and electrical integrated motor." The steering torque sensor 94 is provided at an intermediate portion of the steering shaft 92 to detect a steering torque applied by the driver. The motor drive device 101 controls a drive of the motor 80 based on the steering torque so that the motor 80 generates a desired assist torque. The assist torque generated by the motor 80 is transmitted to the steering shaft 92 via the reduction gear 89.

For example, the rotation angle sensor 85 is configured with a Hall element facing a sensor magnet 87 fixed to the tip of the shaft 86, and detects a motor rotation angle θ based on a change in a magnetic flux of the sensor magnet 87. In addition to the rotation angle sensor with the Hall element, a rotation angle sensor such as a resolver may be used. The motor rotation angle θ is converted into a steering angle of the steering wheel 91 using the reduction ratio. In the calculation using the motor rotation angle θ, a neutral position of the steering angle is used as a reference.

Figure 5:
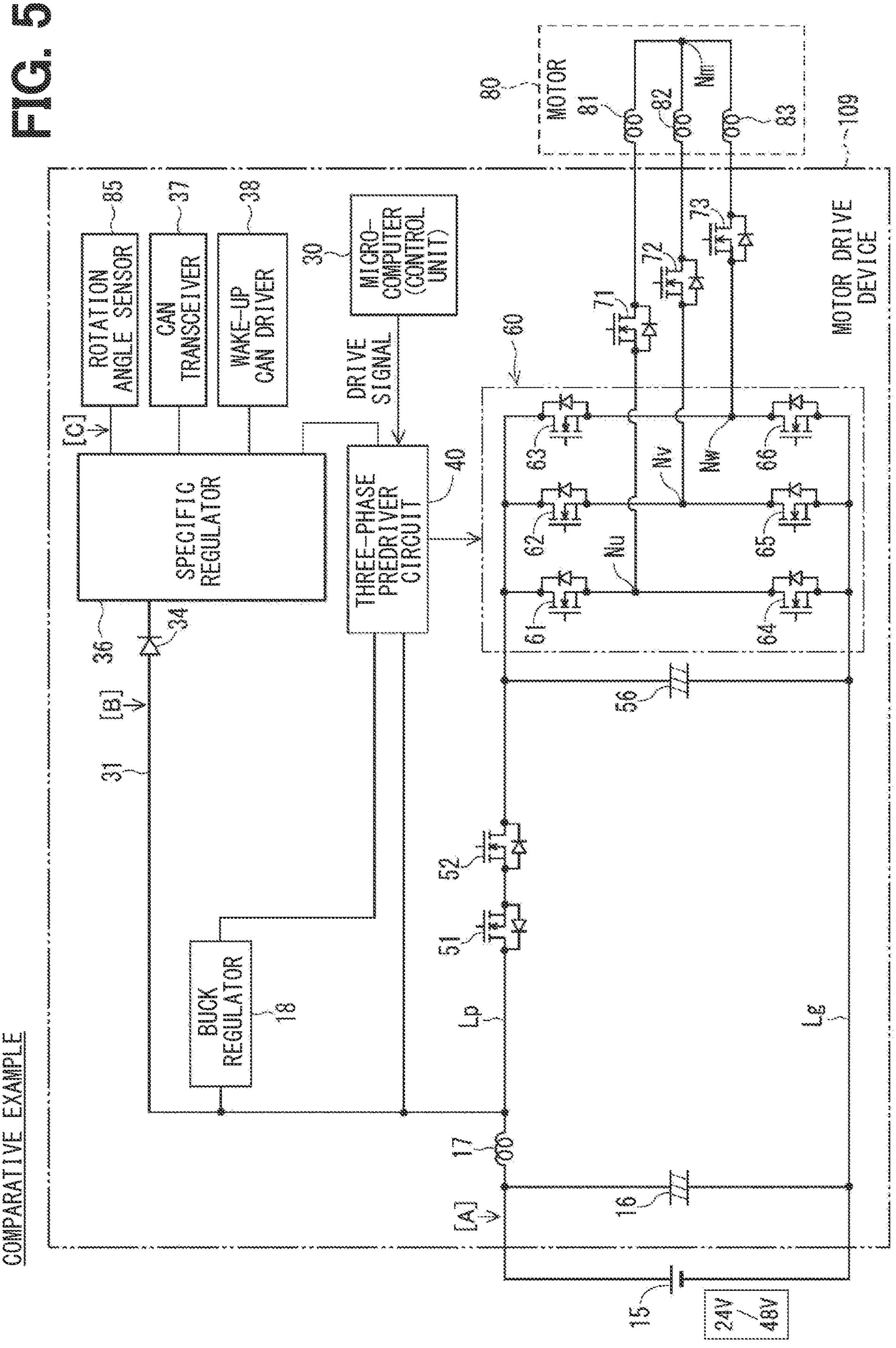
FIG. 5 is a configuration diagram of a motor drive device of a comparative example.

Here, with reference to FIGS. 5 and 6, the operation of the motor drive device 109 of the comparative example will be described. The motor drive device 109 of the comparative example does not include the booster circuit 20 and the post-boost capacitor 25. Only the battery voltage via the first power supply path 31 is supplied to the specific regulator 36. Even if the booster circuit 20 and the post-boost capacitor 25 are provided for another purpose, it is equivalent to the comparative example if a path for supplying the boosted voltage to the specific regulator 36 is not provided.

Here, only the rotation angle sensor 85 will be described as the target circuit. When a voltage equal to or higher than a lower limit value is constantly supplied from the battery 15 to the specific regulator 36 via the first power supply path 31, the rotation angle sensor 85 can continue to operate. Therefore, the information on the neutral position of the steering angle is maintained, and the motor drive device can accurately calculate the steering angle in an assist control.

However, for example, in the vehicle with the internal combustion engine, the battery voltage may temporarily drop due to engine cranking. A similar voltage drop can occur in the electric vehicle when another device that shares the battery temporarily consumes a large amount of current. FIG. 6 shows voltage changes at points [A], [B], and [C] in FIG. 5 when the battery voltage decreases. FIG. 6[A] indicates a supply voltage from the battery 15 to the power supply line Lp. FIG. 6[B] indicates an input voltage to the specific regulator 36 from the first power supply path 31. FIG. 6[C] indicates an input voltage to the rotation angle sensor 85 from the specific regulator 36.

When the input voltage of the specific regulator 36 drops below the lower limit value as the voltage supplied from the battery 15 to the power supply line Lp decreases, the specific regulator 36 is no longer able to output the voltage that causes the rotation angle sensor 85 to operate. Then, the input voltage of the rotation angle sensor 85 falls below the lower limit value, and the rotation angle sensor 85 stops operating. Thereafter, when the battery voltage is restored due to the end of engine cranking, for example, the voltages at the points [A], [B], and [C] are restored.

However, when the rotation angle sensor 85 temporarily stops operating, the information on the neutral position of the steering angle will not be maintained after returning, and an accurate steering angle calculation will not be possible in assist control. Therefore, the influence is greater on the electric power steering device. Therefore, the rotation angle sensor 85 is required to continue operating reliably without stopping its operation even temporarily. In the three-phase predriver circuit 40, the CAN transceiver 37, and the wake-up CAN driver 38, which are other target circuits, the effect of temporary operation stoppage is small.

In contrast to the comparative example, the motor drive device 101 of the first embodiment includes the booster circuit 20 and the post-boost capacitor 25, and is provided with a second power supply path 32 that connects the post-boost capacitor 25 and the specific regulator 36. Therefore, when it is within the discharge time range based on the capacity of the post-boost capacitor 25, regardless of the decrease in battery voltage, at least the voltage charged in the post-boost capacitor 25 is applied to the specific regulator 36. In fact, since the current consumption of the rotation angle sensor 85 is small, the time during which the post-boost capacitor 25 can be discharged is sufficiently long.

Figure 3:
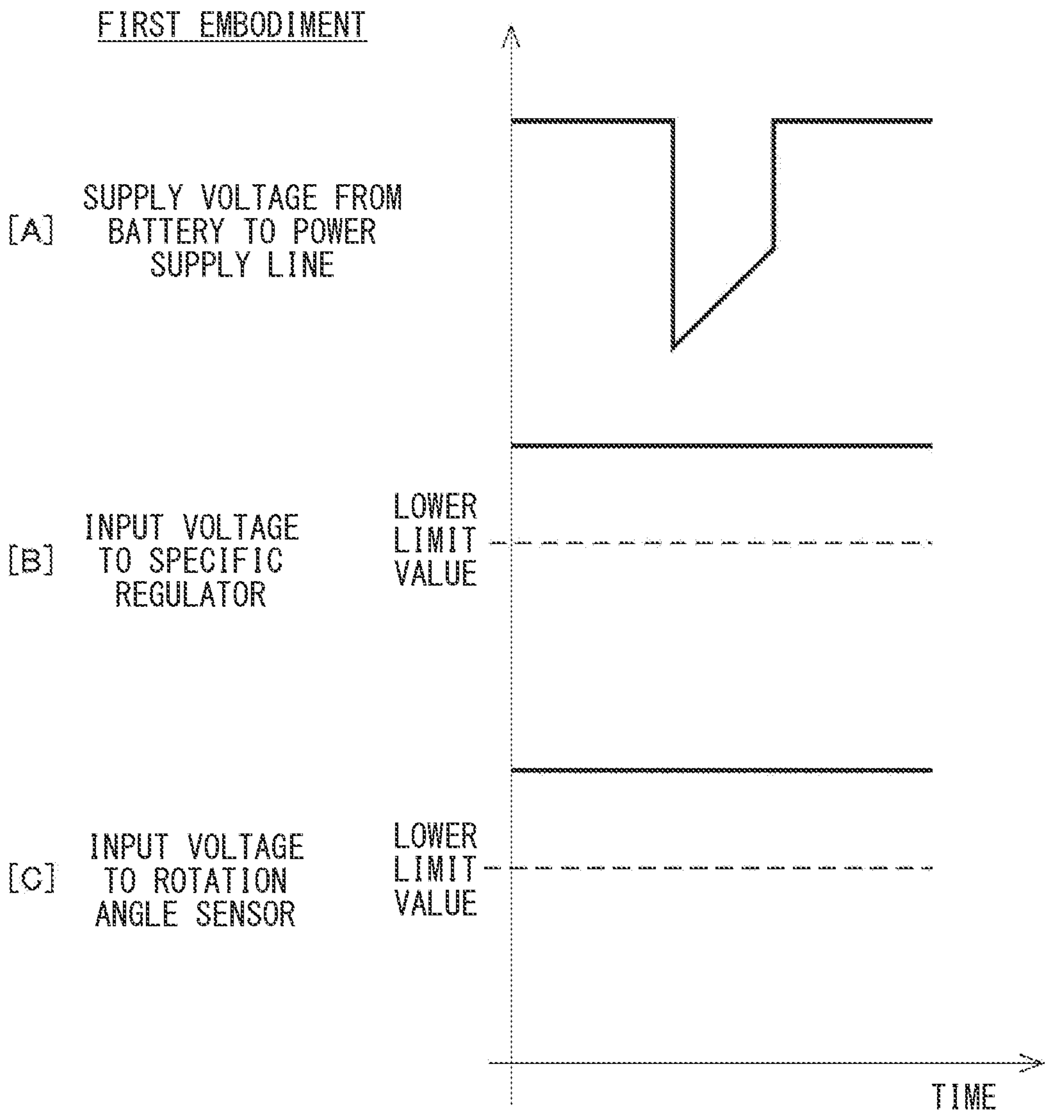
FIG. 3 is a diagram showing voltage changes at various points when a battery voltage drops in the first embodiment.
Figure 6:
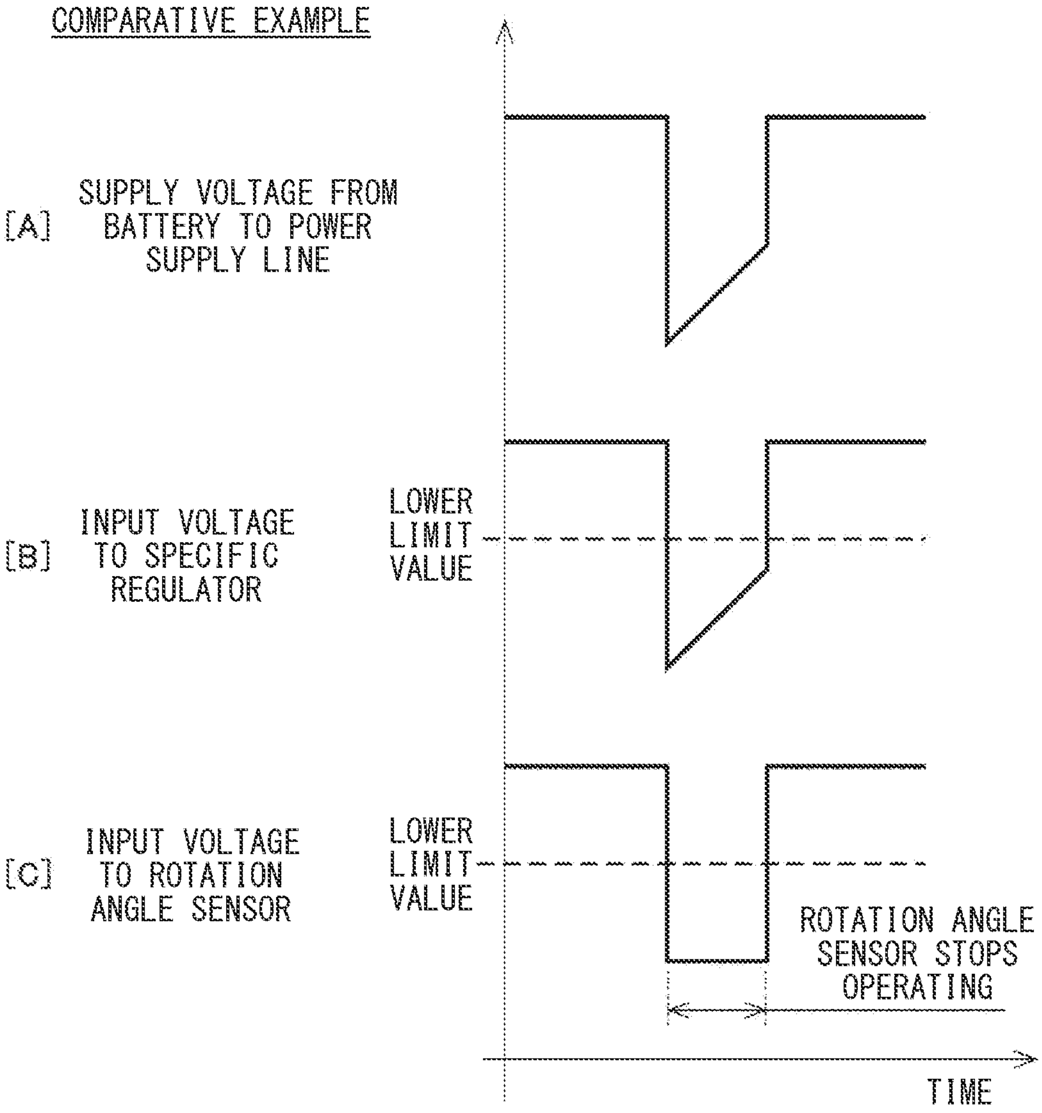
FIG. 6 is a diagram showing voltage changes at various points when the battery voltage drops in a comparative example.

Corresponding to FIG. 6 of the comparative example, FIG. 3 shows voltage changes at various points when the battery voltage drops in the first embodiment. FIG. 3[B] indicates an input voltage to the specific regulator 36 from the second power supply path 32. Even in a situation where the supply voltage at the point [A] is decreased as in the comparative example as shown in FIG. 3[A], the input voltage to the specific regulator 36 at the point [B] and the input voltage to the rotation angle sensor 85 at the point [C] are equal to or higher than the lower limit value as shown in FIGS. 3[B] and 3[C].

In this way, in the motor drive device 101 of the first embodiment, the rotation angle sensor 85 can continue to operate even if the voltage supplied from the battery 15 to the power supply line Lp temporarily decreases. Therefore, since the information on the neutral position of the steering angle is maintained after returning, accurate steering angle calculation can be performed in assist control of the electric power steering device 90.

Second Embodiment

Figure 4:
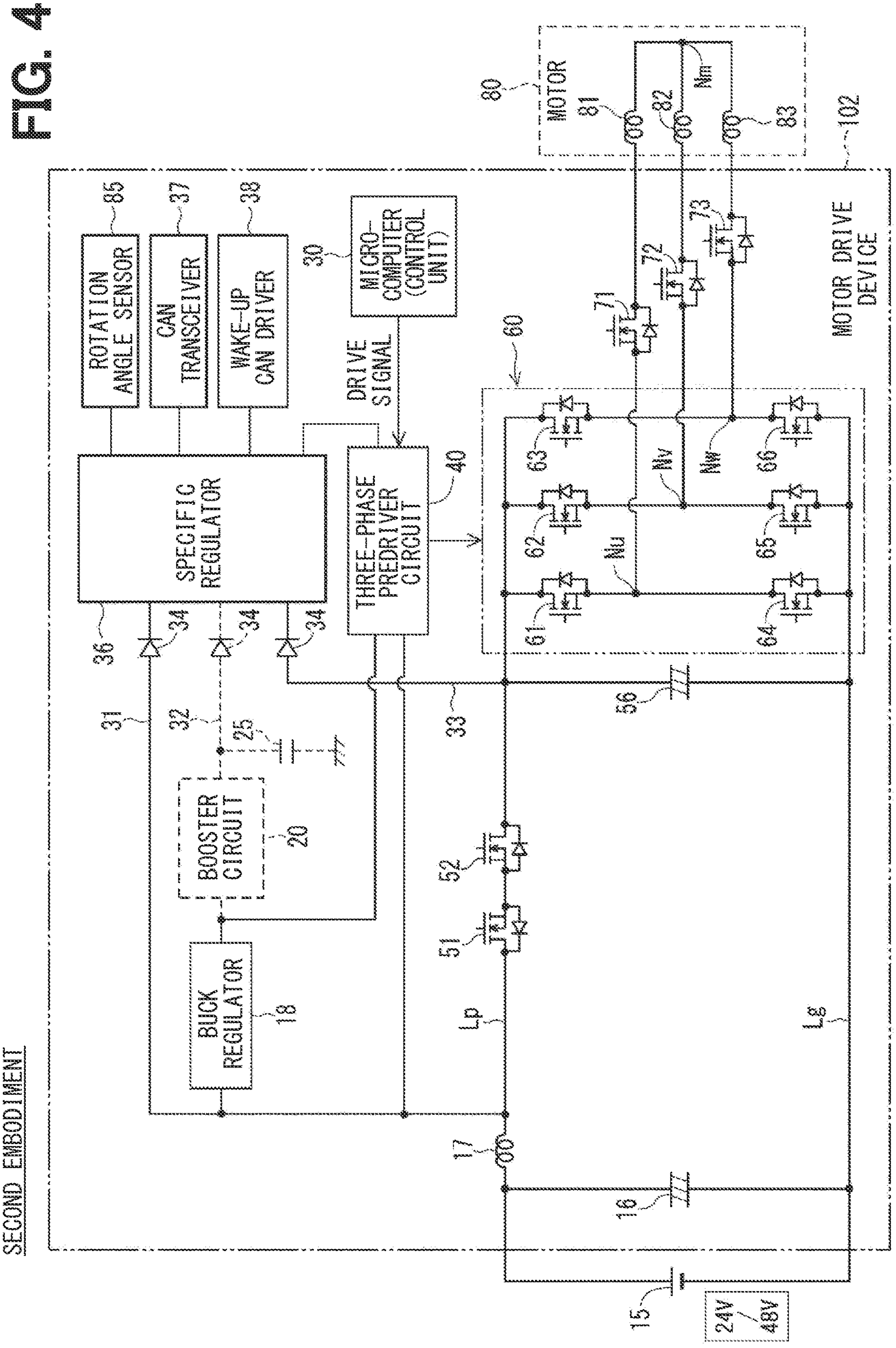
FIG. 4 is a configuration diagram of a motor drive device according to a second embodiment.

A second embodiment will be described with reference to FIG. 4. In the motor drive device 102 of the second embodiment, a high potential electrode of the inverter capacitor 56 and the specific regulator 36 are connected via a third power supply path 33. A diode 34 is provided in the third power supply path 33 to prevent reverse current flow.

As described above, the inverter capacitor 56 is connected in parallel with the inverter 60 between the power supply line Lp and the ground line Lg, and is charged with the voltage applied to the inverter 60. The boosted voltage charged in the inverter capacitor 56 is applied to the specific regulator 36 via the third power supply path 33. Therefore, when it is within the discharge time range based on the capacity of the inverter capacitor 56, regardless of the decrease in battery voltage, at least the voltage charged in the inverter capacitor 56 is applied to the specific regulator 36. Therefore, the same effects as in the first embodiment can be obtained.

As shown by the broken line, the booster circuit 20, the post-boost capacitor 25, and the second power supply path 32 of the first embodiment may not be provided. Alternatively, by combining the first embodiment and the second embodiment, the voltage charged in the post-boost capacitor 25 and the inverter capacitor 56 may be supplied doubly to the specific regulator 36 via the second and third power supply paths 32 and 33.

By the way, when the reverse connection protection relay 52 on the power supply line Lp is turned ON, the voltage charged in the inverter capacitor 56 is also applied to the specific regulator 36 from the first power supply path 31 via the power supply line Lp. On the other hand, when the reverse connection protection relay 52 is turned OFF, the power supply path from the inverter capacitor 56 via the power supply line Lp is cut off. The power supply relay 51 has a path that passes through a free wheel diode regardless of whether the power supply relay 51 is turned ON or OFF. Therefore, in the second embodiment, it is possible to continue supplying power to the specific regulator 36 even when the reverse connection protection relay 52 is turned OFF.

OTHER EMBODIMENTS (a) In a motor drive device in which the load is a motor and the target circuit is a rotation angle sensor, the applicable system is not limited to an electric power steering device. The effects of the present embodiment are particularly effective in systems that are greatly affected by the temporary stoppage of the rotation angle sensor.

(b) Furthermore, the load of the load driving device of the present disclosure is not limited to the three-phase motor 80, but may be a single-phase motor or a polyphase motor other than three-phase motor, or an actuator or other load other than the motor. As the "power converter", an H-bridge circuit or the like may be used instead of a polyphase inverter.

(c) The target circuit operated by power supply from the specific regulator 36 is not limited to the one exemplified in the above embodiments, and may be any circuit.

The present disclosure should not be limited to the embodiment described above. Various other embodiments may be implemented without departing from the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A load driving device, comprising:

a power converter provided between a power supply line and a ground line connected to a battery, and configured to convert a direct-current power of the battery and supply it to a load;

a booster circuit configured to boost a voltage of the battery supplied via the power supply line;

a post-boost capacitor configured to be charged with a boosted voltage by the booster circuit; and a specific regulator configured to operate a target circuit when a voltage equal to or higher than a lower limit value is applied via a power supply path;

wherein the power supply path includes a first power supply path that is directly connected from the power supply line to the specific regulator and is configured to apply the battery voltage to the specific regulator; and a second power supply path that branches from the first power supply path and is connected to the specific regulator via the booster circuit and the post-boost capacitor, and each of the first power supply path and the second power supply path includes a reverse-current blocking element, and at least the voltage charged in the post-boost capacitor is applied to the specific regulator.

2. A load driving device, comprising:

a power converter provided between a power supply line and a ground line connected to a battery, and configured to convert a direct-current power of the battery and supply it to a load;

a power converter capacitor connected in parallel with the power converter between the power supply line and the ground line, and configured to be charged with a voltage applied to the power converter; and a specific regulator configured to operate a target circuit when a voltage equal to or higher than a lower limit value is applied via a power supply path;

wherein the power supply path connects a high-potential terminal of the power converter capacitor to the specific regulator and includes a reverse-current blocking element, and at least a voltage charged in the power converter capacitor is applied to the specific regulator.

3. The load driving device according to claim 1, wherein the load is a motor.

4. The load driving device according to claim 2, wherein the load is a motor.

5. The load driving device according to claim 3, wherein the target circuit includes a rotation angle sensor that detects a rotation angle of the motor.

6. The load driving device according to claim 4, wherein the target circuit includes a rotation angle sensor that detects a rotation angle of the motor.

7. The load driving device according to claim 5, wherein the load is a steering assist motor of an electric power steering device.

8. The load driving device according to claim 6, wherein the load is a steering assist motor of an electric power steering device.

9. The load driving device according to claim 1, wherein the post-boost capacitor includes a capacitance such that, during a temporary drop of the battery voltage, the voltage applied to the specific regulator via the second power supply path is maintained at or above the lower limit value for a discharge time range.

10. The load driving device according to claim 2, wherein the power supply line includes a protection switch configured to selectively disconnect the power converter capacitor from the power supply line, and the power supply path is configured to continue applying the voltage charged in the power converter capacitor to the specific regulator when the protection switch disconnects the power converter capacitor from the power supply line.

* * * * *